United States Patent
Bunn et al.

(10) Patent No.: US 8,635,212 B1
(45) Date of Patent: Jan. 21, 2014

(54) FLOATING RANKING OF PRODUCT RESULTS

(75) Inventors: Paul Bunn, Mountain View, CA (US); Shashidhar Anil Thakur, Saratoga, CA (US); Ashutosh Shukla, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/454,818

(22) Filed: Apr. 24, 2012

Related U.S. Application Data

(60) Provisional application No. 61/622,247, filed on Apr. 10, 2012.

(51) Int. Cl.
*G06F 7/00* (2006.01)
*G06F 17/30* (2006.01)

(52) U.S. Cl.
USPC .......................................... 707/723; 707/706

(58) Field of Classification Search
USPC .................................................. 707/723, 706
See application file for complete search history.

(56) References Cited

U.S. PATENT DOCUMENTS 8,086,600 B2   12/2011   Bailey et al.

*Primary Examiner* — Ann Chempakaseril
(74) *Attorney, Agent, or Firm* — Harrity & Harrity, LLP

(57) ABSTRACT

A ranked list of first search results based on a search query may be associated with a first search category, and each first search result may be associated with a first score. A ranked list of second search results based on the search query may be associated with a second, different search category, and a second search result may be associated with a second score. A final second score may be determined based on the second score and a function that maps scores associated with the second search category to scores associated with the first search category, information may be inserted relating to the ranked list of second search results at a position within the ranked list of first search results to form a set of search results, and the set of search results may be provided.

20 Claims, 10 Drawing Sheets

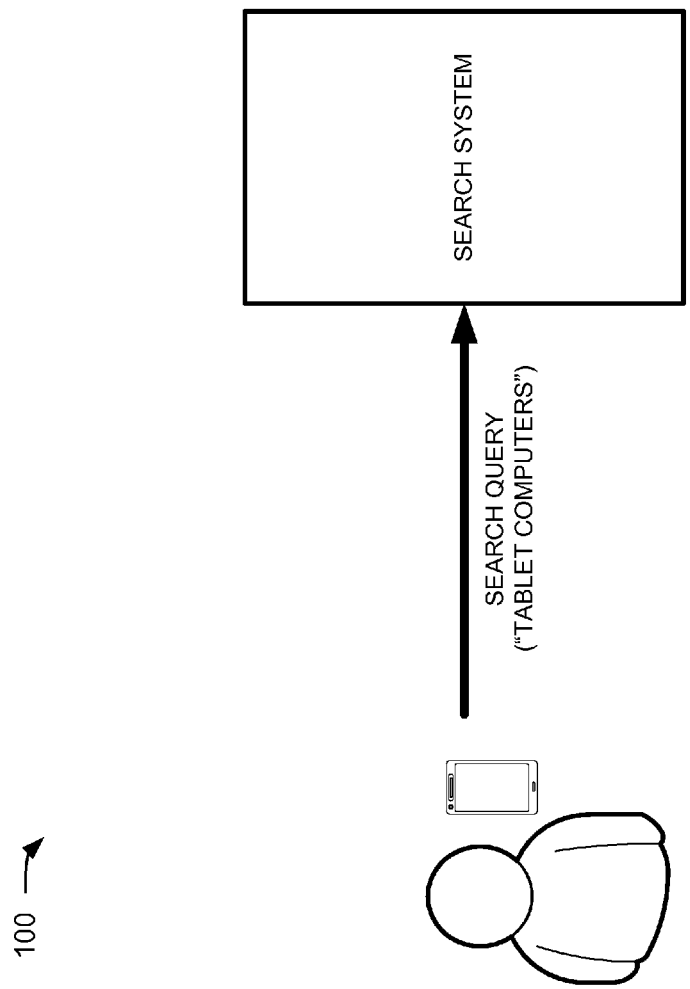

FLOATING RANKING OF PRODUCT RESULTS

RELATED APPLICATION

This application claims priority under 35 U.S.C. §119 based on U.S. Provisional Patent Application No. 61/622,247, filed Apr. 10, 2012, the disclosure of which is incorporated by reference herein in its entirety.

BACKGROUND

Many techniques are available to a user today to find information on the World Wide Web, also referred to as the "web." For example, web browsers and/or search engines may be used to find information of interest. In some instances, a search query may be provided to different searching engines to provide a user with different categories of search results. For example, a search query may be provided to different search engines to obtain general results, product results, news results, image results, video results, and/or other categories of results. Alternatively, a search query may be provided to a search engine that uses different search indexes to provide different categories of results.

SUMMARY

According to some implementations, a method may include obtaining, by one or more computer devices, a ranked list of first search results based on a search query. The first search results may be associated with a first search category, and the first search results, in the ranked list of first search results, may be associated first scores. The method may further include obtaining, by the one or more computer devices, a ranked list of second search results based on the search query. The second search results may be associated with a second, different search category, and a second search result, in the ranked list of second search results, may be associated with a second score. The method may also include determining, by the one or more computer devices, a final second score based on the second score and a function that maps scores associated with the second search category to scores associated with the first search category; inserting, by the one or more computer devices and based on the final second score, information relating to the ranked list of second search results at a position within the ranked list of first search results to form a set of search results; and providing, by the one or more computer devices, the set of search results.

According to some implementations, a system may include one or more computer devices to receive a ranked list of first search results based on a search query. The first search results may be associated with a first search category, and each first search result, in the ranked list of first search results, may be associated with a first score. The one or more computer devices may further receive a ranked list of second search results based on the search query. The second search results may be associated with a second, different search category, and a second search result, in the ranked list of second search results, may be associated with a second score. The one or more computer devices may also determine a final second score based on the second score and a function that maps scores associated with the second search category to scores associated with the first search category, insert, based on the final second score, information relating to the ranked list of second search results at a position within the ranked list of first search results to form a set of search results, and provide the set of search results.

According to some implementations, a computer-readable medium may store instructions. The instructions may include one or more instructions, which, when executed by one or more processors, cause the one or more processors to receive a ranked list of first search results. The first search results may be associated with a first search category, and each first search result, in the ranked list of first search results, may be associated with a first score. The one or more instructions may further cause the one or more processors to receive a ranked list of second search results. The second search results may be associated with a second, different search category, and a second search result, in the ranked list of second search results, may be associated with a second score. The one or more instructions may also cause the one or more processors to obtain an adjusted second score based on the second score and clickthrough rate information associated with the second search result, identify a position, within the ranked list of first search results, to insert information relating to the ranked list of second search results based on the adjusted second score and a function that maps scores associated with the second search category to scores associated with the first search category, insert the information relating to the ranked list of second search results at the identified position to create a set of search results, and provide the set of search results.

BRIEF DESCRIPTION OF THE DRAWINGS

The accompanying drawings, which are incorporated in and constitute a part of this specification, illustrate some implementations described herein and, together with the description, explain these implementations. In the drawings:

FIGS. 1A-1C are diagrams illustrating an overview of an example implementation described herein;

DETAILED DESCRIPTION

The following detailed description refers to the accompanying drawings. The same reference numbers in different drawings may identify the same or similar elements.

Systems and/or methods, as described herein, may determine the placement of product search results in a list of general search results. The product search results may include, for example, information identifying a group of products, e.g., items and/or services for sale, that is relevant to a search query. The general search results may include another category of search results relating to the search query, such as search results obtained by from an image search, a news search, a video search, a book search, a blog search, a local search, a search of a local area network, a search of a wide area network, a search performed on a user device, and/or another category of search.

As an example, a search query, which relates to shopping, may be processed by a general search engine to obtain general search results and by a products search engine to obtain, as product search results, information identifying a group of products, e.g., items and/or services for sale, that is relevant to the search query. The product search results may be ranked, in connection with the general search results, based on the relative strength of the product search results and the distribution and relative strength of the general search results.

The term document, as used herein, is to be broadly interpreted to include any machine-readable and machine-storable work product. A document may include, for example, a website, an e-mail, a business listing, a file, a combination of files, one or more files with embedded links to other files, a news group posting, a blog, etc. In the context of the Internet, a common document is a web page. Documents often include textual information and may include embedded information, such as meta information, images, hyperlinks, etc., and/or embedded instructions, such as Javascript, etc. The term search result, as used herein, is to be broadly interpreted to include a document or a link to a document.

While the following description focuses on intermingling product search results with general search results in a ranked list of search results, systems and/or methods, described herein, are equally applicable to other categories of searches. Moreover, systems and/or methods, as described herein, may combine search results from two or more categories of searches to form a list of search results.

Figure 1B:
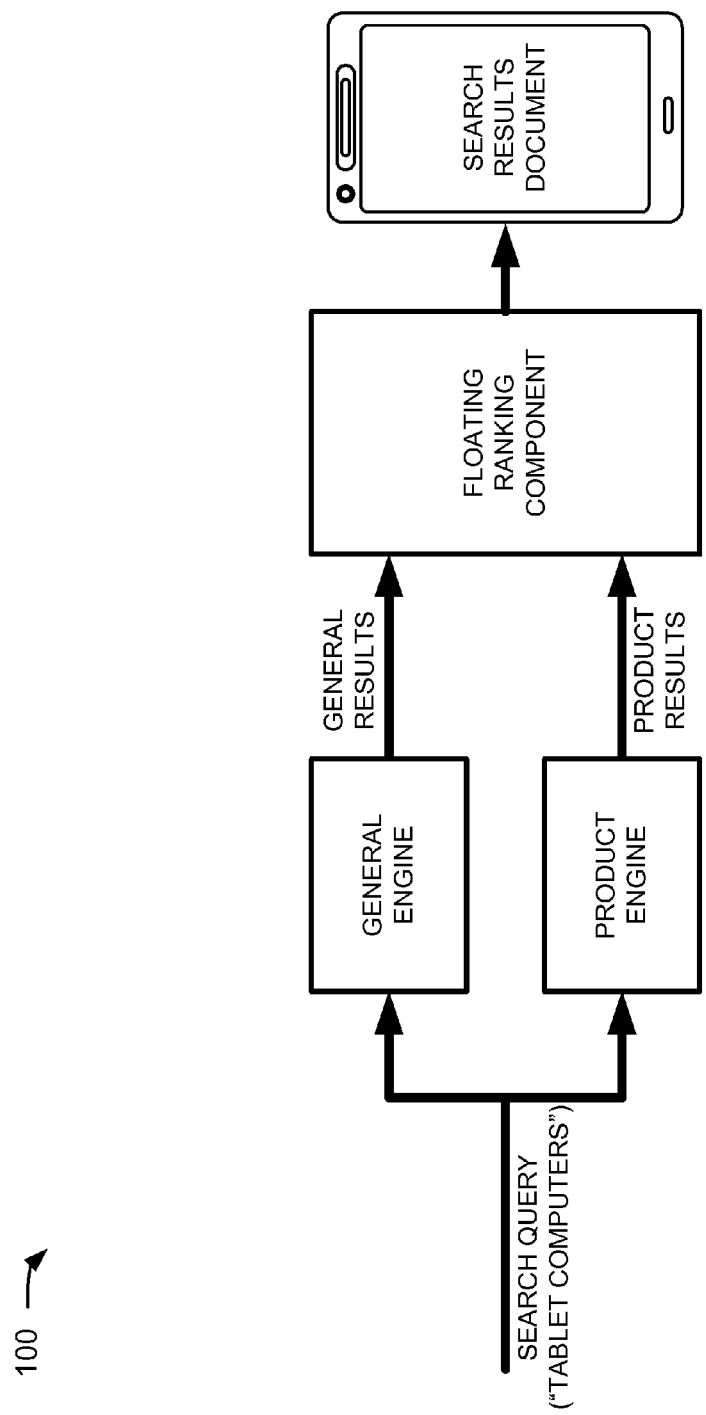
Figure 1C:
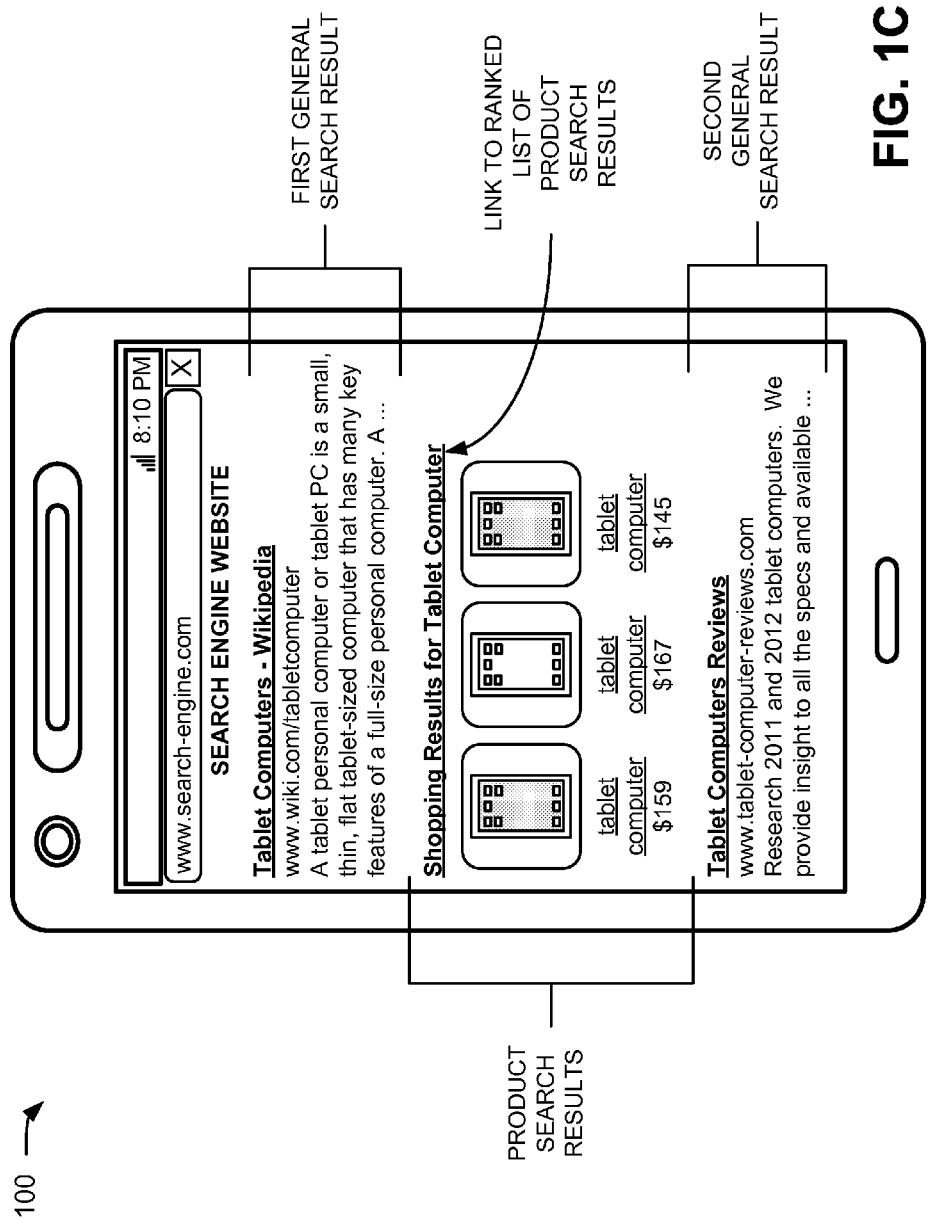

FIGS. 1A-1C are diagrams illustrating an overview of an example implementation 100 described herein. Assume, for example implementation 100, that a user is interested in obtaining information about tablet computers. Thus, as shown in FIG. 1A, the user may use a client, depicted as a smartphone, to submit, to a search system, a search query that includes the terms "tablet computers."

As shown in FIG. 1B, the search system may include a general search engine and a product search engine. The search system may feed the search query to both search engines to obtain search results. For example, the general search engine may receive the search query and provide a ranked list of general search results to the floating ranking component. Further, the product search engine may receive the search query and provide a ranked list of product search results to the floating ranking component. The floating ranking component may consider the quality of the general search results in determining where, in the list of general search results, to place the product search results in a search results document. In some instances, the floating ranking component may, based on indications of the quality of the general search results and indications of the quality of the product search results, insert the product search results before the list of general search results. In other instances, the floating ranking component may, based on indications of the quality of the general search results and indications of the quality of the product search results, determine that the product search results are not to be inserted in the list of general search results. In still other instances, the floating ranking component may, based on indications of the quality of the general search results and indications of the quality of the product search results, insert the product search results after a first general search result, a second general search result, and/or after any other general search result. In any event, the floating ranking component may provide the search results document to the client.

Assume, for example implementation 100, that floating ranking component determines that the product search results are to be inserted after the first general search result. Thus, as shown in FIG. 1C, the search results document may, when rendered for display on the client, include a list of general search results, with the product search results placed after the first general search result. The product search results may include a quantity of the highest ranking product search results, e.g., the 3 highest ranking product search results are shown in FIG. 1C for explanatory purposes, along with a link to the ranked list of search results. Thus, if the user is interested in purchasing a tablet computer, the user may select one of the displayed product search results or select the link to obtain the ranked list of product search results.

Figure 2:
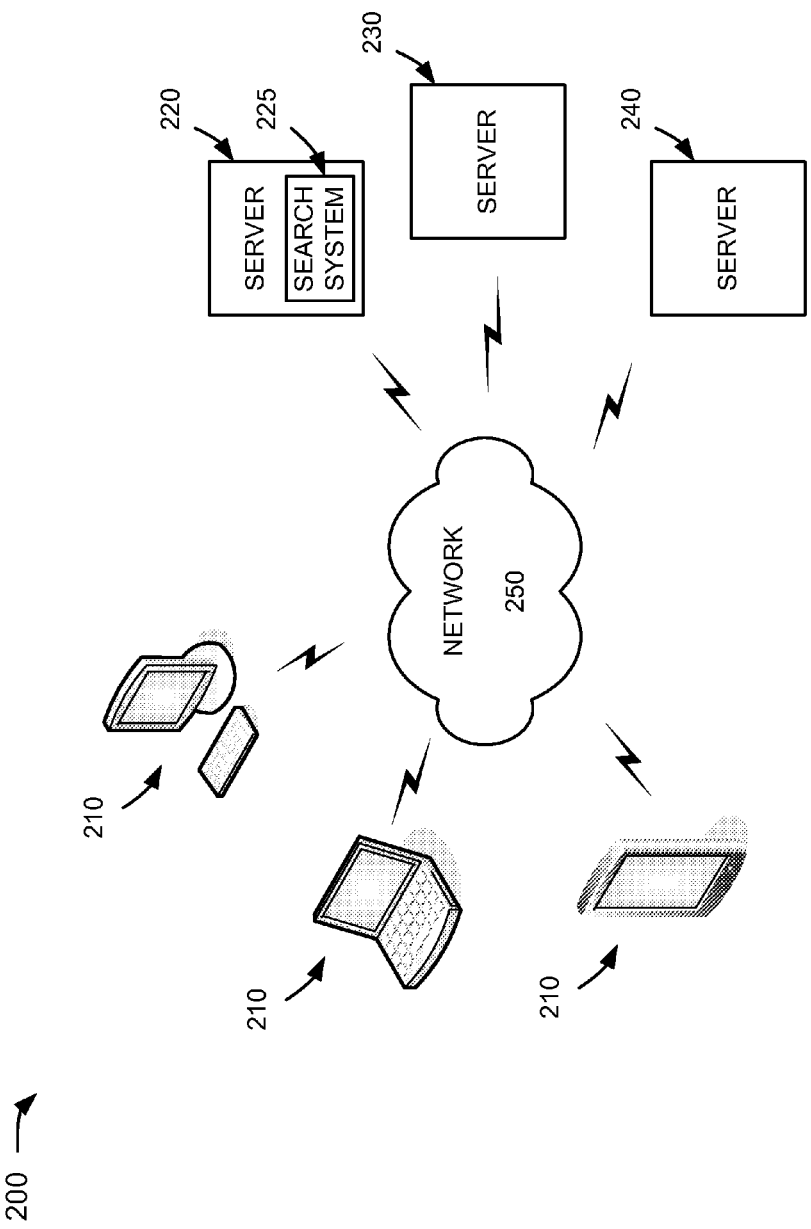
FIG. 2 is a diagram of an example environment in which systems and/or methods described herein may be implemented.

FIG. 2 is a diagram of an example environment 200 in which systems and/or methods described herein may be implemented. Environment 200 may include multiple clients 210 connected to multiple servers 220-240 via a network 250.

Each of clients 210 may include a client device, such as personal computer, a wireless telephone, a personal digital assistant (PDA), a laptop, a tablet computer, or another type of computation or communication device. Clients 210 may include user interfaces presented through one or more browsers, e.g., web browsers.

Servers 220-240 may include server devices that gather, process, search, and/or implement functions in a manner described herein. Each server 220-240 may be implemented as a single server device or a collection of server devices that may be co-located or remotely located. Additionally, or alternatively, any two or more of servers 220-240 may be implemented within a single, common server device or a single, common collection of server devices. While servers 220-240 are shown as separate components, it may be possible for one or more of servers 220-240 to perform one or more of the functions of another one or more of servers 220-240.

As shown in FIG. 2, server 220 may implement a search system 225 that receives search queries from clients 210, and that provides search results that are responsive to the search queries. Server 220 may crawl different categories of documents, e.g., web pages, images, documents relating to products, documents relating to news, etc., index the documents, and store information associated with the documents. In some implementations, server 220 may maintain a different index for each of the different categories of documents. Servers 230 and 240 may store or maintain documents that may be crawled or analyzed by server 220.

Network 250 may include any type of network, such as, for example, a local area network (LAN), a wide area network (WAN), a telephone network, such as the Public Switched Telephone Network (PSTN) or a cellular network, an intranet, the Internet, a combination of networks, etc. Clients 210 and servers 220-240 may connect to network 250 via wired and/or wireless connections. In other words, any one of clients 210 and servers 220-240 may connect to network 250 via a wired connection, a wireless connection, or a combination of a wired connection and a wireless connection.

Although FIG. 2 shows example components of environment 200, in some implementations, environment 200 may include additional devices and/or networks, fewer devices and/or networks, different devices and/or networks, and/or differently arranged devices and/or networks than those depicted in FIG. 2. Additionally, or alternatively, one or more components of environment 200 may perform one or more tasks described as being performed by one or more other components of environment 200.

Figure 3:
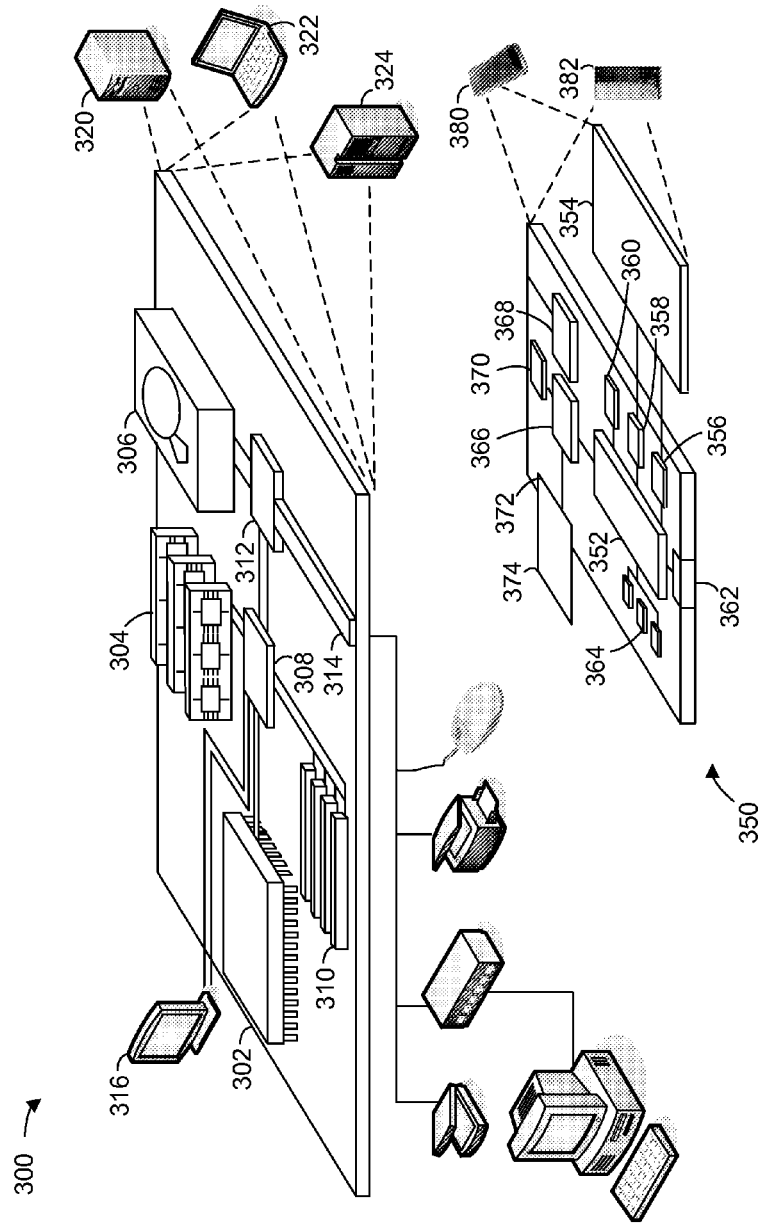
FIG. 3 shows an example of a generic computer device and a generic mobile computer device.

FIG. 3 is a diagram of an example of a generic computing device 300 and a generic mobile computing device 350, which may be used with the techniques described here. Generic computing device 300 or generic mobile computing device 350 may correspond to, for example, a client 210 and/or a server 220, 230, or 240. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, tablet computers, and other similar computing devices. The components shown in FIG. 3, their connections and relationships, and their functions, are meant to be examples only, and are not meant to limit implementations described herein.

Computing device 300 may include a processor 302, a memory 304, a storage device 306, a high-speed interface 308 connecting to memory 304 and high-speed expansion ports 310, and a low-speed interface 312 connecting to a low-speed expansion port 314 and a storage device 306. Each of components 302, 304, 306, 308, 310, 312, and 314, are interconnected using various buses, and may be mounted on a common motherboard or in other manners as appropriate. Processor 302 can process instructions for execution within computing device 300, including instructions stored in memory 304 or on storage device 306 to display graphical information for a graphical user interface (GUI) on an external input/output device, such as display 316 coupled to high-speed interface 308. In some implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within computing device 300. In some implementations, memory 304 includes a volatile memory unit or units. In some implementations, memory 304 may include a non-volatile memory unit or units. Memory 304 may also be another form of computer-readable medium, such as a magnetic or optical disk. A computer-readable medium may refer to a non-transitory memory device. A memory device may refer to storage space within a single storage device or spread across multiple storage devices.

Storage device 306 is capable of providing mass storage for computing device 300. In some implementations, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or a memory on processor 302.

High-speed interface 308 manages bandwidth-intensive operations for computing device 300, while low-speed interface 312 manages lower bandwidth-intensive operations. Such allocation of functions is provided for explanatory purposes only. In some implementations, high-speed interface 308 is coupled to memory 304, display 316, e.g., through a graphics processor or accelerator, and to high-speed expansion ports 310, which may accept various expansion cards. In some implementations, low-speed interface 312 may be coupled to storage device 306 and low-speed expansion port 314. Low-speed expansion port 314, which may include various communication ports, e.g., USB, Bluetooth, Ethernet, wireless Ethernet, etc., may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, computing device 300 may be implemented as a standard server 320, or multiple times in a group of such servers. Computing device 300 may also be implemented as part of a rack server system 324. In addition, computing device 300 may be implemented in a personal computer, such as a laptop computer 322. Alternatively, components from computing device 300 may be combined with other components in a mobile device, such as mobile computing device 350. Each of such devices may contain one or more of computing devices 300, 350, and an entire system may be made up of multiple computing devices 300, 350 communicating with each other.

Mobile computing device 350 may include a processor 352, a memory 364, an input/output device, such as a display 354, a communication interface 366, and a transceiver 368, among other components. Mobile computing device 350 may also be provided with a storage device, such as a micro-drive or other device, to provide additional storage. Each of the components 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a Thin-Film-Transistor Liquid Crystal Display (TFT LCD) or an Organic Light Emitting Diode (OLED) display, or other appropriate display technology. Display interface 356 may include appropriate circuitry for driving display 354 to present graphical and other information to a user. Control interface 358 may receive commands from a user and convert the commands for submission to processor 352. In addition, an external interface 362 may be provided in communication with processor 352, so as to enable near area communication of mobile computing device 350 with other devices. External interface 362 may provide, for example, for wired communication, or for wireless communication, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a Single In Line Memory Module (SIMM) card interface. Such expansion memory 374 may provide extra storage space for device 350, or may also store applications or other information for mobile computing device 350. Specifically, expansion memory 374 may include instructions to carry out or supplement the processes described herein, and may include secure information also. Thus, for example, expansion memory 374 may be provided as a security module for mobile computing device 350, and may be programmed with instructions that permit secure use of mobile computing device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described herein. The information carrier is a computer- or machine-readable medium, such as memory 364, expansion memory 374, or a memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 368. In addition, short-range communication may occur, such as using a Bluetooth, WiFi, or other such transceiver. In addition, Global Positioning System (GPS) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert the received spoken information to digital information. Audio codec 360 may likewise generate audible sound for a user, such as through a speaker, e.g., in a handset of mobile computing device 350. Such sound may include sound from voice telephone calls, may include recorded sound—e.g., voice messages, music files, etc.—and may also include sound generated by applications operating on mobile computing device 350.

Mobile computing device 350 may be implemented in a number of different forms, as shown in FIG. 3. For example, mobile computing device 350 may be implemented as a cellular telephone 380. Mobile computing device 350 may also be implemented as part of a smart phone 382, personal digital assistant, or other similar mobile device.

Various implementations of the systems and techniques described herein can be realized in digital electronic circuitry, integrated circuitry, specially designed application specific integrated circuits (ASICs), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube or liquid crystal display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a web browser through which a user can interact with the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 4:
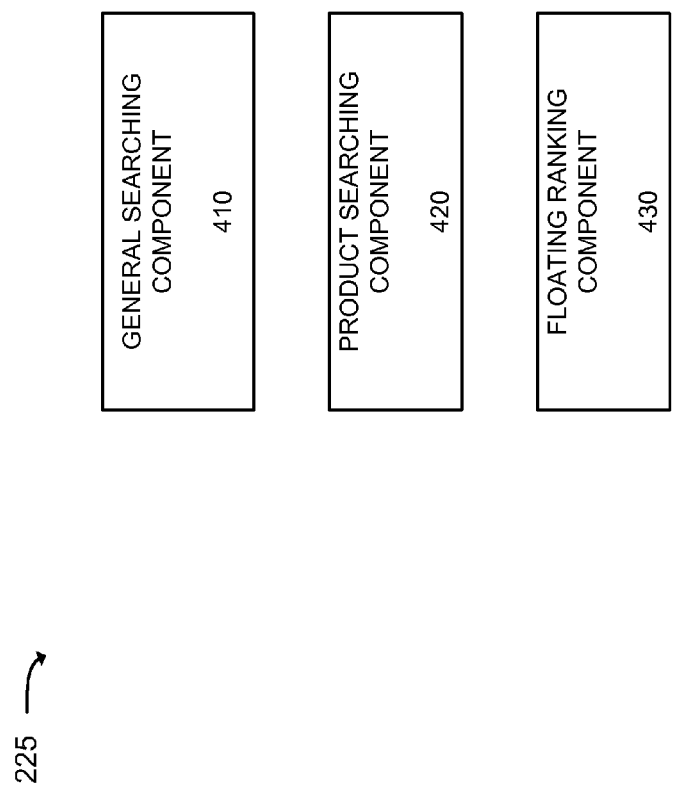
FIG. 4 is a diagram of example functional components of a search system of FIG. 2.

FIG. 4 is a diagram of example functional components of search system 225. Each of the functional blocks, shown in FIG. 4, may be implemented by one or more of the components described with regard to FIG. 3. As shown in FIG. 4, search system 225 may include a general searching component 410, a product searching component 420, and a floating ranking component 430. In some implementations, floating ranking component 430 may be implemented in a location external to search system 225, e.g., as part of a browser toolbar on client 210.

General searching component 410 may receive a search query and identify, as general search results, a group of documents relevant to the search query. For example, general searching component 410 may compare the terms of the search query to terms in an index to obtain a list of potential search results. General searching component 410 may generate scores for the general search results, referred to hereinafter as "general scores." General searching component 410 may generate a general score, for a general search result, based on one or more factors, such as a measure of relevance of the corresponding document to the search query and/or a measure of quality of the document.

General searching component 410 may rank the general search results based on the general scores. For example, general searching component 410 may create a list of general search results and sort the general search results, in the list, based on the general scores of the general search results.

Product searching component 420 may receive a search query and identify, as product search results, a group of products, e.g., items and/or services for sale, relevant to the search query. For example, product searching component 420 may compare the terms of the search query to terms in an index to obtain a list of product search results. Product searching component 420 may generate scores for the product search results, referred to hereinafter as "product scores." Product searching component 420 may generate a product score, for a product search result, based on one or more factors, such as a measure of relevance of the corresponding product to the search query and/or a measure of quality of the product.

Product searching component 420 may rank the product search results based on the product scores. For example, product searching component 420 may create a list of product search results and sort the product search results, in the list, based on the product scores of the product search results.

Floating ranking component 430 may determine the position at which product search results are to be inserted into a ranked list of general search results. For example, floating ranking component 430 may receive the ranked list of general search results, along with the associated general scores, from general searching component 410. In addition, floating ranking component 430 may receive the ranked list of product search results, along with the associated product scores, from product searching component 420. Floating ranking component 430 may generate a document that includes some or all of the general search results, of the ranked list of general search results. Floating ranking component 430 may, based on the general scores and the product score of at least one of the product search results, identify a position, in the ranked list of general search results, at which some or all of the product search results of the ranked list of product search results are to be inserted, in the generated document. Floating ranking component 430 may identify the position using, for example, one or more mapping functions, which map a product score to a general score.

Although FIG. 4 shows example functional components of search system 225, in some implementations, search system 225 may include additional functional components, different functional components, and/or fewer functional components than those depicted in FIG. 4. Additionally, or alternatively, one or more functional components of search system 225 may perform one or more tasks described as being performed by one or more other functional components of search system 225.

Figure 5:
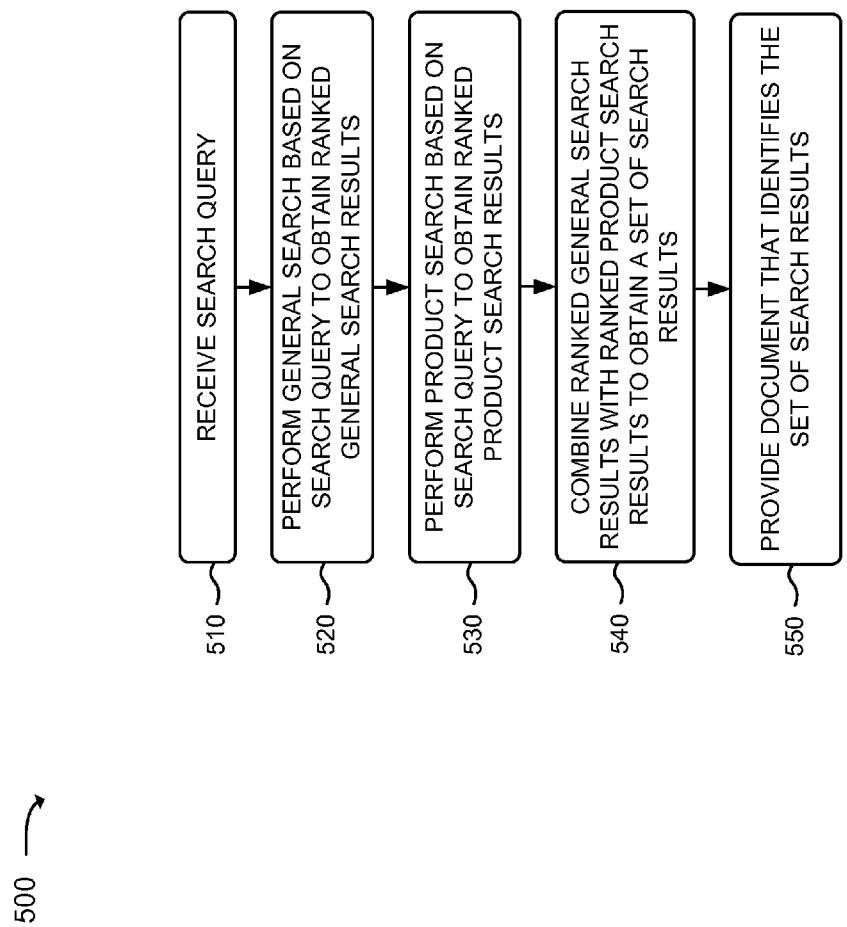
FIG. 5 is a flowchart of an example process for providing search results.

FIG. 5 is a flowchart of an example process 500 for providing search results. In some implementations, process 500 may be performed by server 220, such as by search system 225 of server 220. In some implementations, process 500 may be performed by one or more other devices instead of, or possibly in conjunction with, server 220.

Process 500 may include receiving a search query (block 510). For example, a user, of client 210, may input a search query into client 210 and cause client 210 to submit the search query to search system 225. Search system 225 may receive the search query from client 210.

Process 500 may further include performing a general search based on the search query to obtain a ranked list of general search results (block 520). For example, search system 225, e.g., general searching component 410, may compare the terms of the search query to keywords in an index to obtain a list of general search results. General searching component 410 may generate general scores for the general search results. In some implementations, the general score, for a general search result, may reflect a measure of relevance of the corresponding document to the search query. For example, the general score may reflect the measure of relevance of the corresponding document to the one or more search terms in the search query.

In some implementations, the general score, for a general search result, may reflect a measure of quality of the corresponding document. For example, the search query may be used to identify a relevant document, which is scored based on the document's measure of quality. Several techniques exist for measuring the quality of a document, such as a technique based on a measure of the quality of the source of the document, a technique based on an age of the document, a technique based on user accesses of the document, and/or other techniques.

In some implementations, the general score, for a general search result, may reflect a combination of a measure of relevance of the corresponding document to a search query and a measure of quality of the corresponding document. In some implementations, the general score, for a general search result, may reflect a weighted combination of a measure of relevance of the corresponding document to a search query and a measure of quality of the corresponding document, where the measure of relevance may be weighted differently from the measure of quality. In some implementations, the general score, for a general search result, may be determined in another manner.

General searching component 410 may rank the general search results based on the general scores. For example, general searching component 410 may create a list of general search results and sort the general search results, in the list, based on the general scores of the general search results.

Process 500 may further include performing a product search based on the search query to obtain a ranked list of product search results (block 530). For example, search system 225, e.g., product searching component 420, may compare the terms of the search query to keywords in an index to obtain a list of product search results. Product searching component 420 may generate product scores for the product search results. In some implementations, the product score, for a product search result, may reflect a measure of relevance of the corresponding product to the search query. For example, the product score may reflect the measure of relevance of the corresponding product to the one or more search terms in the search query.

In some implementations, the product score, for a product search result, may reflect a measure of quality of the corresponding product. For example, the search query may be used to identify a relevant product, which is scored based on the product's measure of quality. Several techniques exist for measuring the quality of a product, such as a technique based on a measure of the quality of the source of the product, e.g., the website or company from which the product is sold, a technique based on user selections of a link to the product, a technique based on user reviews of the product, and/or other techniques.

In some implementations, the product score, for a product search result, may reflect a combination of a measure of relevance of the corresponding product to a search query and a measure of quality of the corresponding product. For example, the product score, for a product search result, may reflect a weighted combination of a measure of relevance of the corresponding product to a search query and a measure of quality of the corresponding product, where the measure of relevance may be weighted differently from the measure of quality. In some implementations, the product score, for a product search result, may be determined in another manner.

In some implementations, product searching component 420 may perform a product search each time a search query is received by search system 225. In some implementations, product searching component 420 may perform a product search only when a search query is determined to be related to a search for a product. For example, search system 225 may determine that a search query is related to a search for a product based on a number of factors, such as, for example, the quantity of times that the search query has been used to perform a product search, the quantity of times that the search query has been used to perform a general search, a factor indicating how commercial the search query is, link selections or clickthrough information relating to the search query, and/or other factors.

Process 500 may further include combining the ranked general search results with the ranked product search results to obtain a set of search results for the search query (block 540). For example, search system 225, e.g., floating ranking component 430, may use the general scores and the product scores to determine at which position, in the ranked list of general search results, the ranked list of product search results are to be placed. Based on the techniques, described herein, floating ranking component 430 may determine that the ranked list of product search results are to be placed before the ranked list of general search results, that the ranked list of product search results are not to be placed in the ranked list of general search results, or that the product search results are to be placed after any one of the general search results, in the ranked list of general search results. Thus, floating ranking component 430 may flexibly insert some, all, or none of the ranked list of product search results in any position in the ranked list of general search results to create the set of search results. Additional details regarding block 540 are provided below with respect to FIGS. 6-8.

Process 500 may include providing a document that includes the set of search results (block 550). For example, search system 225, e.g., floating ranking component 430, may generate a document that includes the set of search results. In some implementations, floating ranking component 430 may include a subset of the ranked product search results in the document. For example, floating ranking component 430 may include a predetermined quantity of the highest ranking product search results in the document. In one example, the quantity may be based on the position at which the product search results are inserted. For example, a greater quantity of product search results may be included when the product search results are inserted at a higher ranked position, in the set of search results, than when the product search results are inserted at a lower ranked position. The quantity may range from zero to one or more. In some situations, floating ranking component 430 may include, at the position in the document, a link to the ranked list of product search results, in place of one or more product search results or along with one or more product search results.

Additionally, or alternatively, floating ranking component 430 may cause the inserted product search results to be formatted differently than the general search results when the document is rendered for display. For example, floating ranking component 430 may use line spacing, a font, a font size, indentation, etc. in relation to the product search results that is different from what is used for the general search results. In some implementations, floating ranking component 430 may cause one or more images to be displayed, at the position in the document, when the document is rendered for display. In any event, search system 225 may provide the generated document to client 210, for display to the user.

Although FIG. 5 shows example blocks of process 500, in some implementations, process 500 may include additional blocks, different blocks, fewer blocks, and/or differently arranged blocks than those depicted in FIG. 5. Additionally, or alternatively, one or more of the blocks of process 500 may be performed in parallel.

Figure 6:
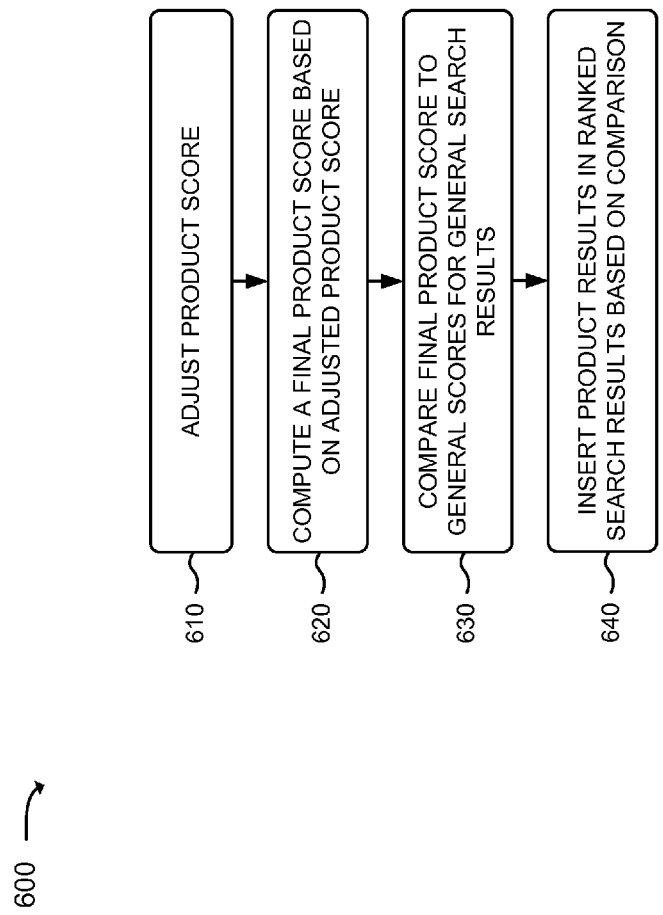
FIGS. 6-8 are flowcharts of example processes that may be performed in connection with the process of FIG. 5.
Figure 7:
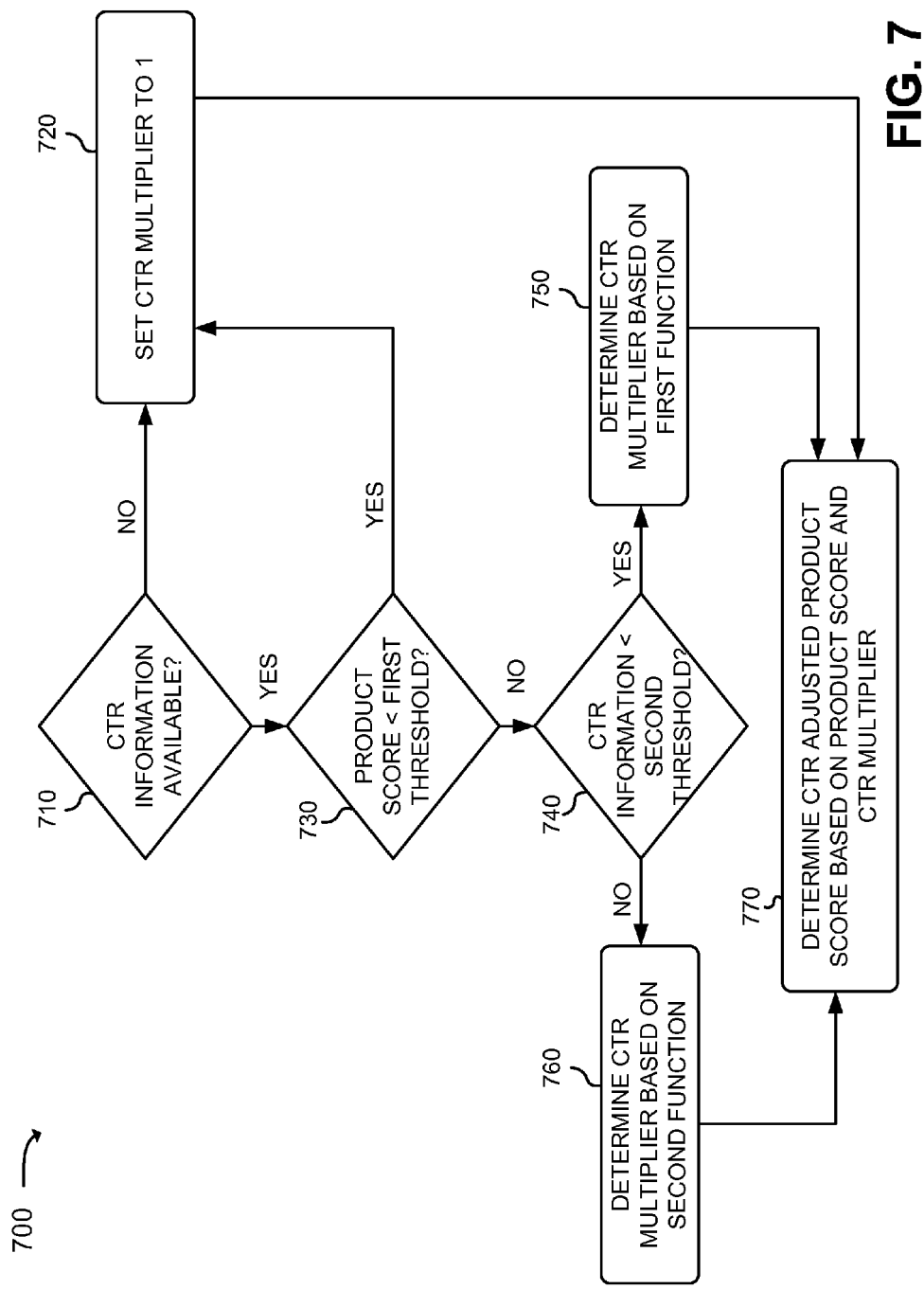
Figure 8:
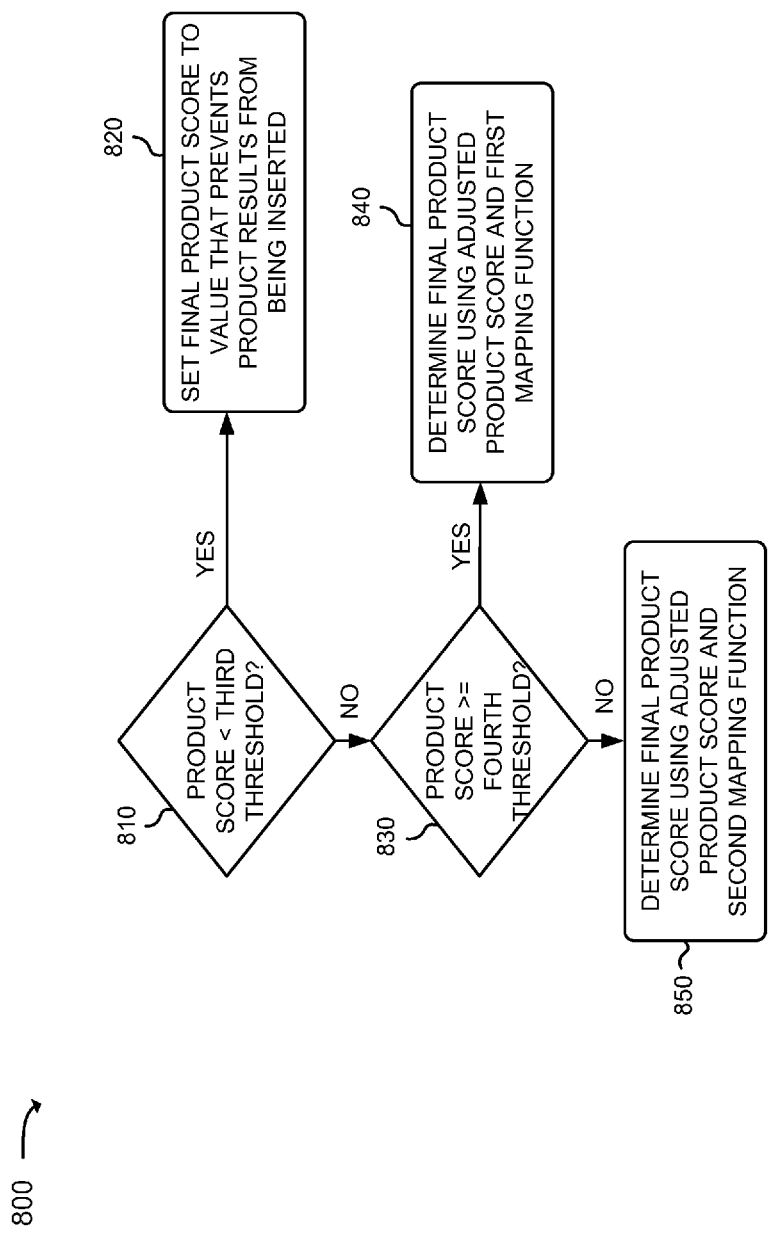

FIGS. 6-8 are flowcharts of example processes that may be performed in connection with block 540 of FIG. 5. In some implementations, the processes of FIGS. 6-8 may be performed by server 220, such as by search system 225 of server 220. In some implementations, the processes of FIGS. 6-8 may be performed by one or more other devices instead of, or possibly in conjunction with, server 220.

As show in FIG. 6, process 600 may include adjusting a product score (block 610). For example, search system 225, e.g., floating ranking component 430, may identify a product score of the highest ranking product search result, in the ranked list of product search results. The product score may be identified as representative for the ranked list of product search results. In some implementations, floating ranking component 430 may determine a product score, as representative for the ranked list of product search results, based on product scores for a quantity of product search results, e.g., a predetermined quantity of highest ranking product search results in the ranked list of product search results. Floating ranking component 430 may identify a product score, as representative for the ranked list of product search results, in other ways. In any event, floating ranking component 430 may adjust the product score based on one or more factors.

In one example, the factors may include factors relating to the general search results, factors relating to both the general search results and the product search results, or factors relating to the product search results. As a first example, the factors may include information that indicates the presence of certain general search results in the ranked list of general search results. For example, if a particular quantity of general search results, in the ranked list of general search results, is associated with commercial websites, this information may be a strong indication that the product search results will be relevant to the search query. Thus, floating ranking component 430 may use this information to adjust the product score.

In a second example, the factors may include information that indicates that one of the top ranking general search results, in the ranked list of general search results, is related to one of the top product search results, in the ranked list of product search results. In this situation, floating ranking component 430 may boost the product score of the product search result and/or use the position of that one general search result to help guide the positioning of the product search result(s).

In a third example, the factors may include clickthrough rate information associated with the product search results. For example, if the clickthrough rate information for the product search result indicates that the product search result is selected by users more than a particular quantity of times when the users have submitted the search query, this information may be a strong indication that the product search results will be relevant to the search query. In some implementations, the clickthrough rate information may include visibility adjusted clickthrough rate information. In any event, floating ranking component 430 may use the clickthrough rate information to adjust the product score. An example process for adjusting a product score based on clickthrough rate information is provided below with respect to FIG. 7. A similar process may be performed for other types of factors.

FIG. 7 is a flowchart of an example process 700 that may be performed in connection with block 610 of FIG. 6. Process 700 may include determining whether clickthrough rate information is available for the product search result (block 710). As indicated above, the product search result may, for example, correspond to the highest ranking product search result, in the ranked list of product search results. In some implementations, search system 225, e.g., floating ranking component 430, may use information identifying the product search result to access a data structure that associates product search results with clickthrough rate information. In some implementations, the clickthrough rate information may correspond to a clickthrough rate or a clickthrough rate that has been adjusted based on one or more factors, such as, for example, visibility, the number of unique users submitting queries, etc. Floating ranking component 430 may obtain the clickthrough rate information, from the data structure, using the identifying information. Floating ranking component 430 may alternatively obtain the clickthrough rate information in other ways.

If the clickthrough rate information is not available (block 710—NO), process 700 may include setting a clickthrough rate multiplier to 1 (block 720). For example, if floating ranking component 430 determines that the data structure does not include clickthrough rate information for the product search result, floating ranking component 430 may set a clickthrough rate multiplier to 1.

If, on the other hand, clickthrough rate information is available (block 710—YES), process 700 may include comparing the product score to a first threshold (block 730). For example, floating ranking component 430 may compare the product score to a first threshold. To determine the first threshold, floating ranking component 430 may identify a range of product scores of product search results that were obtained for search queries received during some period of time, e.g., over the past month. For example, floating ranking component 430 may analyze the product scores for the period of time and determine the particular product score that corresponds to a percentile. The percentile may correspond to a percentage of product scores, in the range of product scores, that are below the particular product score. In one example, the percentile may be 50%. Thus, floating ranking component 430 may determine the particular product score at which 50% of the product scores were above the particular product score, during the period of time, and at which 50% of the product scores were below the particular product score. Floating ranking component 430 may set the first threshold equal to the particular product score. Another percentile value for the first threshold may alternatively be used. In addition, other manners of determining a value for the first threshold may alternatively be used.

If the product score is less than the first threshold (block 730—YES), process 700 may include setting the clickthrough rate multiplier to 1 (block 720). For example, if floating ranking component 430 determines that the product score is less than the first threshold, floating ranking component 430 may set the clickthrough rate multiplier to 1.

If the product score is greater than or equal to the first threshold (block 730—NO), process 700 may include comparing the clickthrough rate information to a second threshold (block 740). For example, floating ranking component 430 may compare, when the product score is greater than or equal to the first threshold, the clickthrough rate information to a second threshold. The second threshold may correspond to 10% or another value.

If the clickthrough rate information is less than the second threshold (block 740—YES), process 700 may include determining the clickthrough rate multiplier based on a first function (block 750). For example, when floating ranking component 430 determines that the clickthrough rate information is less than the second threshold, floating ranking component 430 may set the clickthrough rate multiplier based on a first function. In some implementations, the first function may be based on the clickthrough rate information and a first set of constants. For example, in this situation, floating ranking component 430 may determine the clickthrough rate multiplier as follows:

$$CTR\_multiplier = A1 + B1 * atan(C1 * (CTR - D1)),$$

where CTR_multiplier may correspond to the clickthrough rate multiplier, atan may indicate arctangent, CTR may correspond to the clickthrough rate information, and A1, B1, C1, and D1 may correspond to constants. Floating ranking component 430 may determine the clickthrough rate multiplier in other ways.

If the clickthrough rate information is greater than or equal to the second threshold (block 740—NO), process 700 may include determining the clickthrough rate multiplier based on a second function (block 760). For example, when floating ranking component 430 determines that the clickthrough rate information is greater than or equal to the second threshold, floating ranking component 430 may set the clickthrough rate multiplier based on a second function. In some implementations, the second function may be based on the clickthrough rate information and a second set of constants. For example, in this situation, floating ranking component 430 may determine the clickthrough rate multiplier as follows:

$$CTR\_multiplier = A2 + B2 * atan(C2 * (CTR - D2)),$$

where A2, B2, C2, and D2 are constants. Floating ranking component 430 may determine the clickthrough rate multiplier in other ways.

The first function, described above with respect to block 750, and the second function, described above with respect to block 760, are provided for explanatory purposes only. In some implementations, other functions may be used. For example, a candidate function, to use in connection with blocks 750 and 760, may satisfy the following criteria: the function may be continuous and monotonically increasing, the function may cause the clickthrough rate multiplier to be close to zero when the clickthrough rate information is less than approximately 3%, the function may cause the clickthrough rate multiplier to be close to one when the clickthrough rate information is greater than approximately 7% and less than approximately 13%, and the function may cause the clickthrough rate multiplier to increase rapidly above a value of one as the clickthrough rate information increases above approximately 20%. Other percentages may alternatively be used.

Process 700 may further include determining the clickthrough rate adjusted product score for the product search result based on the product score and the clickthrough rate multiplier (block 770). For example, floating ranking component 430 may determine the clickthrough rate adjusted product score based on the product score and the clickthrough rate multiplier, as determined in block 720, block 750, or block 760. In some implementations, floating ranking component 430 may determine the clickthrough rate adjusted product score as follows:

$$ctr\_adj\_pscore = pscore * CTR\_multiplier,$$

where ctr_adj_pscore may correspond to the clickthrough rate adjusted product score, and pscore may correspond to the product score. In some implementations, floating ranking component 430 may determine the clickthrough rate adjusted product score in other ways.

While two thresholds and two functions are described above, floating ranking component 430 may use additional thresholds and functions in some implementations.

Returning to FIG. 6, process 600 may further include computing a final product score based on the adjusted product score (block 620). For example, search system 225, e.g., floating ranking component 430, may use the clickthrough rate adjusted product score, as determined in block 770 above, to compute a final product score for the product search result. As indicated above, the product search result may, for example, correspond to the highest ranking product search result, in the ranked list of product search results.

FIG. 8 is a flowchart of an example process 800 that may be performed in connection with block 620 of FIG. 6. Process 800 may include determining whether the product score is above a third threshold (block 810). For example, search system 225, e.g., floating ranking component 430, may compare the product score, for the product search result, to a third threshold. In one example, floating ranking component 430 may determine the third threshold in a manner similar to how floating ranking component 430 determined the first threshold. For example, floating ranking component 430 may analyze the range of product scores for the period of time and determine the particular product score that corresponds to a percentile. The percentile may correspond to a percentage of product scores, in the range of product scores, that are below the particular product score. In one example, the percentile may be 20%. Thus, floating ranking component 430 may determine the particular product score at which 80% of the product scores were above the particular product score, in the range of product scores, and at which 20% of the product scores were below the particular product score. Another percentile value for the third threshold may alternatively be used. In addition, other manners of determining a value for the third threshold may alternatively be used.

If the product score is less than the third threshold (block 810—YES), process 800 may include setting the final product score to a value that will prevent the ranked list of product search results from being inserted into the ranked list of general search results (block 820). For example, if floating ranking component 430 determines that the product score is less than the third threshold, floating ranking component 430 may set a final product score, for the product search result, to a value that will prevent the ranked list of product search results from being inserted into the ranked list of general search results. In some implementations, floating ranking component 430 may set the final product score to a value that is below a general score associated with a predetermined general search result, in the ranked list of general search results. The predetermined general search result may correspond to a lowest ranking general search result, in the ranked list of general search results, or another general search result in the ranked list of general search results.

If the product score is greater than or equal to the third threshold (block 810—NO), process 800 may include determining whether the product score is greater than or equal to a fourth threshold (block 830). For example, floating ranking component 430 may compare the product score, for the product search result, to a fourth threshold. In one example, floating ranking component 430 may determine the fourth threshold in a manner similar to how floating ranking component 430 determined the first and third thresholds. For example, floating ranking component 430 may analyze the range of product scores for the period of time and determine the particular product score that corresponds to a percentile. The percentile may correspond to a percentage of product scores, in the range of product scores, that are below the particular product score. In one example, the percentile may be 50%. Thus, floating ranking component 430 may determine the particular product score at which 50% of the product scores were above the particular product score, in the range of product scores, and at which 50% of the product scores were below the particular product score. Thus, in this example, floating ranking component 430 may set the fourth threshold equal to the first threshold determined above. Another percentile value for the fourth threshold may alternatively be used. In addition, other manners of determining a value for the fourth threshold may alternatively be used.

If the product score is greater than or equal to the fourth threshold (block 830—YES), process 800 may include determining the final product score using the adjusted product score and a first mapping function (block 840). For example, when the product score, of the product search result, is greater than or equal to the fourth threshold, floating ranking component 430 may determine the final product score, for the product search result, using the adjusted product score, e.g., as determined in block 770 above, and a first mapping function. In some implementations, the first mapping function may be expressed as:

$$f1:[pscore1,pscore2] \Longrightarrow [W5, \text{Avg}(W1, W2)],$$

where pscore1 may correspond to a lower product score value, pscore2 may correspond to an upper product score value, W5 may correspond to the general score of the general search result in position 5 of the ranked list of general search results, which is referred to hereinafter as "general search result 5," W1 may correspond to the general score of the general search result in position 1 of the ranked list of general search results, which is referred to hereinafter as "general search result 1," and W2 may correspond to the general score of the general search result in position 2 of the ranked list of general search results, which is referred to hereinafter as "general search result 2."

In some implementations, floating ranking component 430 may determine the lower product score (pscore1) and the upper product score (pscore2) based on the range of product scores of product search results that were obtained for search queries received during some period of time, e.g., over the past month. For example, in connection with the upper product score, floating ranking component 430 may analyze the product scores for the period of time and determine the particular product score that corresponds to a first percentile. In one example, the first percentile may be 70%, 80%, 90%, or another percentage. Thus, if the first percentile is considered to be 90%, the upper product score (pscore2) is selected so that 90% of the product scores, in the range of product scores obtained during the period of time, were below the selected product score and 10% of the product scores were above the selected product score. Similarly, in connection with the lower product score, floating ranking component 430 may analyze the product scores for the period of time and determine the particular product score that corresponds to a second percentile. In one example, the second percentile may be 50%. Thus, floating ranking component 430 may set the lower product score (pscore1) equal to the first threshold. Another percentile may alternatively be used for determining the lower product score.

Additionally, or alternatively, floating ranking component 430 may determine the upper product score and the lower product score based on information from users. For example, floating ranking component 430 may obtain information from users, relating to whether a given search query is related to a product search and/or the quality of the corresponding search results for the given search query. Thus, information may be obtained as to whether a given search query is related to a product search or unrelated to a product search. Additionally, or alternatively, information may be obtained as to whether or not product search results, provided in response to the given search query, are relevant to the given search query. Floating ranking component 430 may also determine the range of product scores of product search results that were obtained for search queries received during some period of time, e.g., over the past month. Floating ranking component 430 may use the range of product scores and the information from users to determine the particular upper and lower percentiles to use for determining the upper product score and the lower product score.

In any event, floating ranking component 430 may determine the upper product score and the lower product score for the first mapping function. For explanatory purposes only, assume that the lower product score value corresponds to 1 and the upper product score value corresponds to 15. Other lower and upper values of product scores and other general search result positions, other than positions 5, 2, and 1, may alternatively be used.

Thus, the first mapping function may linearly map a range of product scores, e.g., from the lower product score value to the upper product score value, to a range of general scores. In the example given above, the first mapping function may map the lower product score value to the general score of general search result 5 and map the upper product score value to a weighted average of the general score of general search result 1 and the general score of general search result 2. The weights associated with the general score of general search result 1 and the general score of general search result 2 may be selected so that a greater weight is given to the general score of general search result 2 than the weight given to the general score of general search result 1. In some implementations, the weight given to the general score of general search result 2 may be four times the weight given to the general score of general search result 1. Thus, the weighted average may be expressed as:

$$\tfrac{1}{5}*W1+\tfrac{4}{5}*W2.$$

Other weights may alternatively be used.

Using the first mapping function, floating ranking component 430 may determine the final product score for the product search result as:

$$\text{Final Product Score}=f1(adj\_pscore).$$

By way of example, assume that the first mapping function includes the following values:

$$f1:[1,15]=\!\!\rightarrow[2,\text{Avg}(100,100)].$$

Thus, floating ranking component 430 may map product scores in the range of 1 to 15 to general scores in the range of 2 and 100. Assume further that floating ranking component 430 determined, in block 770 above, the value of the adjusted product score as 1, which corresponds to the lower product score value. In this example, floating ranking component 430 may map the adjusted product score of 1 to a general score of 2. Thus, floating ranking component 430 may determine the final product score to be 2.

As a second example, assume that floating ranking component 430 determined, in block 770 above, the value of the adjusted product score as 15, which corresponds to the upper product score value. In this example, floating ranking component 430 may map the adjusted product score of 15 to a general score of 100. Thus, floating ranking component 430 may determine the final product score to be 100.

As a third example, assume that floating ranking component 430 determined, in block 770 above, the value of the adjusted product score as 8, which is between the lower product score value and the upper product score value. In this example, floating ranking component 430 may map the adjusted product score of 8 to a general score of 51. Thus, floating ranking component 430 may determine the final product score to be 51.

In some instances, the adjusted product score may have a value that is below the lower product score value or above the upper product score value. In either event, floating ranking component 430 may use the first mapping function to also linearly map a product score below the lower product score value or a product score above the upper product score value to a general score. For example, assume that floating ranking component 430 determined, in block 770 above, the value of the adjusted product score as 0.5, which is a value below the lower product score value. In this example, floating ranking component 430 may map the adjusted product score of 0.5 to a general score of −1.5. Similarly, assume that floating ranking component 430 determined, in block 770 above, the value of the adjusted product score as 20, which is a value above the upper product score value. In this example, floating ranking component 430 may map the adjusted product score of 20 to a general score of 135.

If the product score is less than the fourth threshold (block 830—NO), process 800 may include determining the final product score using the adjusted product score and a second mapping function. For example, when the product score, of the product search result, is less than the fourth threshold, floating ranking component 430 may determine the final product score, for the product search result, using the adjusted product score, e.g., as determined in block 770 above, and a second mapping function. In some implementations, the second mapping function may be expressed as:

$$f2:[pscore3,pscore4]\!=\!\!=\!\!>\![0.5*W10,W6],$$

where pscore3 may corresponds to a lower product score value, pscore4 may correspond to an upper product score value, W10 may correspond to the general score of the general search result in position 10 of the ranked list of general search results, which is referred to hereinafter as "general search result 10," and W6 may correspond to the general score of the general search result in position 6 of the ranked list of general search results, which is referred to hereinafter as "general search result 6."

In some implementations, floating ranking component 430 may determine the lower product score (pscore3) and the upper product score (pscore4), for the second mapping function, based on the range of product scores of product search results that were obtained for search queries received during the period of time, e.g., over the past month. For example, in connection with the upper product score (pscore4), floating ranking component 430 may analyze the product scores for the period of time and determine the particular product score that corresponds to a percentile. In one example, the percentile may be 50%. Thus, in this example, floating ranking component 430 may set the upper product score (pscore4) equal to the lower product score (pscore1) described above in connection with the first mapping function. Similarly, in connection with the lower product score (pscore3), floating ranking component 430 may analyze the product scores for the period of time and determine the particular product score that corresponds to a different percentile. In one example, the different percentile may be 20%. Thus, in this example, floating ranking component 430 may set the lower product score (pscore3) equal to the third threshold described above in connection with block 810. The percentiles identified above for determining the lower product score value (pscore3) and the upper product score value (pscore4) have been provided for explanatory purposes only. Other percentiles may alternatively be used.

Additionally, or alternatively, floating ranking component 430 may determine the lower product score and the upper product score, for the second mapping function, based on information from users. For example, floating ranking component 430 may, in a manner similar to that described above with respect to the first mapping function, use information from users to determine the particular lower and upper percentiles to use for determining the lower product score and the upper product score for the second mapping function.

In any event, floating ranking component 430 may determine the lower product score and the upper product score for the second mapping function. For explanatory purposes only, assume that the lower product score value corresponds to 0 and the upper product score value corresponds to 1. Other lower and upper values of product scores and other general search result positions, other than positions 10 and 6, may alternatively be used.

Thus, the second mapping function may linearly map a range of product scores, e.g., from the lower product score value to the upper product score value, to a range of general scores. In the example given above, the second mapping function may map the lower product score value to the general score of general search result 10 and map the upper product score value to the general score of general search result 6.

Using the second mapping function, floating ranking component 430 may determine the final product score for the product search result as:

Final Product Score=$f2(adj\_pscore)$.

By way of example, assume that the second mapping function includes the following values:

$f2:[0,1] \rightarrow [0.5*4,8]$.

Thus, floating ranking component 430 may map product scores in the range of 0 to 1 to general scores in the range of 2 and 8. Assume further that floating ranking component 430 determined, in block 770 above, the value of the adjusted product score as 0, which corresponds to the lower product score value. In this example, floating ranking component 430 may map the adjusted product score of 0 to a general score of 2. Thus, floating ranking component 430 may determine the final product score to be 2.

As a second example, assume that floating ranking component 430 determined, in block 770 above, the value of the adjusted product score as 1, which corresponds to the upper product score value. In this example, floating ranking component 430 may map the adjusted product score of 1 to a general score of 8. Thus, floating ranking component 430 may determine the final product score to be 8.

As a third example, assume that floating ranking component 430 determined, in block 770 above, the value of the adjusted product score as 0.5, which is between the lower product score value and the upper product score value. In this example, floating ranking component 430 may map the adjusted product score of 0.5 to a general score of 5. Thus, floating ranking component 430 may determine the final product score to be 5.

In some instances, the adjusted product score may have a value that is below the lower product score value or above the upper product score value. In either event, floating ranking component 430 may use the second mapping function to also linearly map a product score below the lower product score value or a product score above the upper product score value to a general score. For example, assume that floating ranking component 430 determined, in block 770 above, the value of the adjusted product score as −1, which is a value below the lower product score value. In this example, floating ranking component 430 may map the adjusted product score of −1 to a general score of −4. Similarly, assume that floating ranking component 430 determined, in block 770 above, the value of the adjusted product score as 2, which is a value above the upper product score value. In this example, floating ranking component 430 may map the adjusted product score of 2 to a general score of 14.

Returning again to FIG. 6, process 600 may include comparing the final product score to general scores of the general search results in the ranked list of general search results (block 630) and inserting the product search results into the ranked list of general search results based on the comparison (block 640). For example, floating ranking component 430 may compare the final product score for the product search result, as determined in connection with block 820, block 840, or block 850 of process 800, to the general scores of the general search results in the ranked list of general search results.

Floating ranking component 430 may insert the ranked list of product search results into the ranked list of general search results based on comparing the final product score for the product search result to the general scores of the general search results in the ranked list of general search results. In some implementations, floating ranking component 430 may insert a subset of the ranked list of product search results. For example, floating ranking component 430 may insert no product search results, the top ranking product search result, the top three highest ranking product search results, or some other quantity of the top ranking product search results. Additionally, or alternatively, floating ranking component 430 may insert a link to the ranked list of product search results.

Although FIGS. 6-8 shows example blocks of process 600, 700, and 800, in some implementations, process 600, 700, and/or 800 may include additional blocks, different blocks, fewer blocks, and/or differently arranged blocks than those depicted in FIGS. 6-8. Additionally, or alternatively, one or more of the blocks of process 600, 700, and/or 800 may be performed in parallel.

Systems and methods, as described herein, may provide a ranked list of search results that include product search results and general search results. The product search results may be inserted into a position in the ranked list of search results based on the quality of the product search results and the quality of the general search results.

The foregoing description provides illustration and description, but is not intended to be exhaustive or to limit the implementations to the precise form disclosed. Modifications and variations are possible in light of the above teachings or may be acquired from practice of the implementations. For example, while the above description focused on insertion of a ranked list of product search results into a ranked list of general search results based on a product score of a highest ranking product search result in the ranked list of product search results. It will be appreciated that systems and methods, as described herein, are not so limited. In some implementations, product scores from a quantity of product search results may be used for making the insertion decision.

Additionally, or alternatively, while the above description focused on inserting the ranked list of product search results into a single position in the ranked list of general search results, systems and methods, as described herein, are not so limited. For example, floating ranking component 430 may mix the product search results with the general search results in multiple positions. In this situation, floating ranking component 430 may, for example, apply the functions/algorithms/parameters, described above as being applied to the highest ranking product search result, to each individual product search result to identify the position, within the ranked list of general search results, at which to insert the individual product search result.

Alternatively, floating ranking component 430 may use first functions/algorithms/parameters for one product search result and second functions/algorithms/parameters for a different product search result. For example, floating ranking component 430 may use the first functions/algorithms/parameters for a first group of product search results, which includes a predetermined quantity of the highest ranking product search results in the ranked list of product search results, and the second functions/algorithms/parameters for a second group of product search results that includes product search results that are not included in the first group. As a second example, floating ranking component 430 may use different functions/algorithms/parameters for each product search result. In this example, floating ranking component 430 may identify the correct functions/algorithms/parameters to use based on the rank of the product search results in the ranked list of product search results.

As an alternative to the processing described above in connection with FIGS. 5-8, systems and/or methods, as described herein, may make the decision as to which position, in a ranked list of general search results, to insert the product search results based solely on the product score of the highest ranking product search result. For example, systems and/or methods, as described herein may compare the product score to a range of possible product scores. The placement of the product search results among the general search results may depend solely on the relative value of the product score among all possible product scores, and may be independent of the general scores of the general search results. For example, if the product score is at the high end of the range of possible product scores, then the product search results may be placed in a higher, predetermined position, in the ranked list of general search results, independent of the quality of the general search results. If, on the other hand, the product score is at the low end of the range of possible product scores, then the product search results may be inserted into a lower, predetermined position in the ranked list of general search results or simply discarded.

Additionally, or alternatively, systems and/or methods, as described herein, may make the decision as to which position, in a ranked list of general search results, to insert the product search results based solely on the general scores of the general search results. For example, systems and/or methods, as described herein may insert the product search results into a predetermined position in the ranked list of general search results, based only on the general scores.

Additionally, or alternatively, systems and/or methods, as described herein, may insert product search results, in a ranked list of general search results, only in fixed positions. For example, if the product score for the highest ranking product search result is above a first threshold, the product search results may be inserted before the general search results in the ranked list of general search results. If the product score is below a second threshold, the product search results may be inserted after all the general search results. If the product score is below the first threshold and above the second threshold, the product search results may be inserted in a fixed position X within the ranked list of general search results, where X may correspond to a position between the first general search result and the last general search result.

Additionally, or alternatively, systems and/or methods, as described herein, may insert product search results, in a ranked list of general search results, only in semi-fixed positions. For example, a product score between values A and B may cause the product search results to be inserted in either position X or position Y, where the choice of position X or position Y depends on the general score of the general search result in position X. For example, if the general score of the general search result in position X is above a threshold, the product search results may be inserted at position Y. If, on the other hand, the general score of the general search result in position X is below the threshold, the product search results may be inserted at position X.

Additionally, or alternatively, systems and/or methods, as described herein, may use the general search engine to rank the product search results or the product search engine to rank the general search results to create a ranked list of search results. In either case, the product search results may be provided with the general search results in the ranked list of search results.

As an alternative to the processing described above with respect to FIGS. 5-8 where systems and/or methods determined where to insert product search results into a list of general search results, systems and/or methods, as described herein, may determine where to insert general search results into the list of product search results. In this alternative example, floating ranking component 430 may determine a range of general scores in, possibly, an off-line process. Floating ranking component 430 may use the range of general scores to identify a percentile at which a given general search result lies. Floating ranking component 430 may then map this percentile to a product score using, for example, a linear mapping function, defined via [a, b]→[c, d], where 'a' and 'b' are percentiles relating to general scores and [c, d] are based on the distribution of product scores of product search results returned at the time that the search query is received. Thus, while in the processing described above with respect to FIGS. 5-8, 'a' and 'b' correspond to percentiles of product scores, and 'c' and 'd' are based on the scores of the general search results returned at the time that the search query is received, the alternative approach described here makes 'a' and 'b' depend on percentiles of general scores, and 'c' and 'd' depend on the product scores of the product search results returned at the time that the search query is received.

As yet another alternative, systems and/or methods, described herein, may determine where to insert a product search result into a list of general search results based on percentiles. By way of example, assume a particular general search result has a general score of 100, which puts that general search result in the $80^{th}$ percentile among all general scores. Assume further that a particular product search result has a product score of 15, which puts that product search result in the $81^{st}$ percentile (among on product scores). Thus, in this example, floating ranking component 430 may insert the product search result just above this general search result, since 81 is just bigger than 80.

While the above description provided example mapping functions, systems and/or methods, as described herein, may use other types of mapping functions and/or other parameters in relation to the mapping functions. For example, floating ranking component 430 may use a monotonically-increasing mapping function, such as an arctangent-based function, or another type of function instead of a linear function. Moreover, while specific general search results positions were provided in the example mapping functions described above, other general search result positions, including weighted combinations of general search result positions, or other distributions of general scores may alternatively be used.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the articles "a" and "an" are intended to include one or more items. Where only one item is intended, the term "one" or similar language is used. Further, the phrase "based on" is intended to mean "based, at least in part, on" unless explicitly stated otherwise.

What is claimed is:

1. A method comprising:
   obtaining, by one or more computer devices, a ranked list of first search results based on a search query,
      the first search results being associated with a first search category, and
      the first search results, in the ranked list of first search results, being associated with first scores;
   obtaining, by the one or more computer devices, a ranked list of second search results based on the search query,
      the second search results being associated with a second, different search category, and
      a second search result, in the ranked list of second search results, being associated with a second score;
   determining, by the one or more computer devices, a final second score, for the second search result, based on:
      the second score, and
      a function that maps scores associated with the second search category to scores associated with the first search category,
      the determining the final second score including:
         determining a multiplier value;
         determining an adjusted second score based on the multiplier value and the second score, and
         determining the final second score by using the function and the adjusted second score;
   inserting, by the one or more computer devices and based on the final second score, information relating to the ranked list of second search results at a position within the ranked list of first search results to form a set of search results; and
   providing, by the one or more computer devices, the set of search results.

2. The method of claim 1, where the function maps a range of scores associated with the second search category to a range of first scores associated with a plurality of first search results in the ranked list of first search results, and
   where determining the final second score includes:
      using the function to map the adjusted second score to a third score,
      the third score including a value within the range of first scores when the adjusted second score includes a value within the range of scores associated with the second search category, and
      setting the final second score to the third score.

3. The method of claim 1, where the information relating to the ranked list of second search results includes:
   a link that points to the ranked list of second search results.

4. The method of claim 1, where inserting the information includes:
   comparing the final second score to one or more of the first scores associated with the ranked list of first search results, and
   identifying the position based on the comparing.

5. The method of claim 1, where determining the final second score includes:
   calculating the final second score based on clickthrough rate information associated with the second search result.

6. The method of claim 1, where determining the multiplier value includes:
   determining the multiplier value based on clickthrough rate information associated with the second search result.

7. The method of claim 1, where determining the multiplier value includes:
   comparing the second score to a first threshold,
   setting the multiplier value to one when the second score is less than the first threshold,
   comparing the clickthrough rate information to a second threshold when the second score is greater than or equal to the first threshold,
   determining the multiplier value based on a first function when the clickthrough rate information is less than the second threshold, and
   determining the multiplier value based on a second function when the clickthrough rate information is greater than or equal to the second threshold,
   where the first function is different than the second function.

8. A system comprising:
   a memory; and
   one or more computer devices coupled to the memory, the one or more computer devices to:
      receive a ranked list of first search results based on a search query,
         the first search results being associated with a first search category, and
         each first search result, in the ranked list of first search results, being associated with a first score,
      receive a ranked list of second search results based on the search query,
         the second search results being associated with a second, different search category, and
         a second search result, in the ranked list of second search results, being associated with a second score,
      determine a final second score based on the second score and a function that maps scores associated with the second search category to scores associated with the first search category,
      where, when determining the final second score, the one or more computer devices are to:
         determine a multiplier value,
         determine an adjusted second score based on the multiplier value and the second score, and determine the final second score using the function and the adjusted second score;

insert, based on the final second score, information relating to the ranked list of second search results at a position within the ranked list of first search results to form a set of search results, and provide the set of search results.

9. The system of claim 8, where the function maps a range of scores associated with the second search category to a range of first scores associated with a plurality of first search results in the ranked list of first search results, and where, when determining the final second score, the one or more computer devices are to:

use the function to map the adjusted second score to a third score, the third score including a value within the range of first scores when the adjusted second score includes a value within the range of scores associated with the second search category, and set the final second score to the third score.

10. The system of claim 8, where, when inserting the information, the one or more computer devices are to:

compare the final second score to one or more of the first scores associated with the ranked list of first search results, and identify the position based on comparing the final second score to the one or more first scores.

11. The system of claim 8, where, when determining the final second score, the one or more computer devices are to:

calculate the final second score based on clickthrough rate information associated with the second search result.

12. The system of claim 8, where, when determining the multiplier value, the one or more computer devices are to:

compare the second score to a first threshold, set the multiplier value to one when the second score is less than the first threshold, compare the clickthrough rate information to a second threshold when the second score is greater than or equal to the first threshold, determine the multiplier value based on a first function when the clickthrough rate information is less than the second threshold, and determine the multiplier value based on a second function when the clickthrough rate information is greater than or equal to the second threshold, where the first function is different than the second function.

13. A non-transitory computer-readable medium for storing instructions, the instructions comprising:

one or more instructions, which, when executed by one or more processors, cause the one or more processors to:

receive a ranked list of first search results, the first search results being associated with a first search category, and each first search result, in the ranked list of first search results, being associated with a first score, receive a ranked list of second search results, the second search results being associated with a second, different search category, and a second search result, in the ranked list of second search results, being associated with a second score, determine a multiplier value, obtain an adjusted second score based on:

the multiplier value, the second score, and clickthrough rate information associated with the second search result, identify a position, within the ranked list of first search results, to insert information relating to the ranked list of second search results based on the adjusted second score and a function that maps scores associated with the second search category to scores associated with the first search category, the one or more instructions to identify the position including:

one or more instructions to identify the position using the function and the adjusted second score;

insert the information relating to the ranked list of second search results at the identified position to create a set of search results, and provide the set of search results.

14. The non-transitory computer-readable medium of claim 13, where the function maps a range of scores associated with the second search category to a range of first scores associated with a plurality of first search results in the ranked list of first search results, and where the one or more instructions to determine the final second score include:

one or more instructions to use the function to map the adjusted second score to a third score, the third score including a value within the range of first scores when the adjusted second score includes a value within the range of scores associated with the second search category, and one or more instructions to set the final second score to the third score.

15. The non-transitory computer-readable medium of claim 13, where the one or more instructions to determine the multiplier value include:

one or more instructions to compare the second score to a first threshold, one or more instructions to set the multiplier value to one when the second score is less than the first threshold, one or more instructions to compare the clickthrough rate information to a second threshold when the second score is greater than or equal to the first threshold, one or more instructions to determine the multiplier value based on a first function when the clickthrough rate information is less than the second threshold, and one or more instructions to determine the multiplier value based on a second function when the clickthrough rate information is greater than or equal to the second threshold, where the first function is different than the second function.

16. The method of claim 1, where the first search category includes a general search category and the second search category includes a product search category.

17. The method of claim 1, where the ranked list of second search results includes a ranked list of products for sale.

18. The system of claim 8, where the first search category includes a general search category and the second search category includes a product search category.

19. The system of claim 8, where the ranked list of second search results includes a ranked list of products for sale.

20. The non-transitory computer-readable medium of claim 13, where the ranked list of second search results includes a ranked list of products for sale.

* * * * *